United States Patent [19]

Badía et al.

[11] Patent Number: 5,007,380

[45] Date of Patent: Apr. 16, 1991

[54] FOWL FEEDER

[75] Inventors: Antonio R. Badía; José F. Tarazaga, both of Vilafranca del Penedés, Spain

[73] Assignee: Tecnica e Innovationes Ganaderas, S. A., Vilafranca del Penedees, Spain

[21] Appl. No.: 457,979

[22] Filed: Dec. 27, 1989

[30] Foreign Application Priority Data

Jan. 13, 1989 [ES] Spain .................................. 8900123

[51] Int. Cl.$^5$ ............................................. A01K 39/01
[52] U.S. Cl. ..................................... 119/53; 119/57.4
[58] Field of Search ........................ 119/53, 57.4, 52.4

[56] References Cited

U.S. PATENT DOCUMENTS

| 4,348,988 | 9/1982 | Lawson | 119/53 |
| 4,476,811 | 10/1984 | Swatendruber | 119/57.4 |
| 4,527,513 | 7/1985 | Hart et al. | 119/57.4 X |
| 4,552,095 | 11/1985 | Segalla | 119/57.4 X |

FOREIGN PATENT DOCUMENTS 2483652 12/1981 France .................................. 119/53

Primary Examiner—Robert P. Swiatek
Assistant Examiner—Todd E. Manahan
Attorney, Agent, or Firm—Cushman, Darby & Cushman

[57] ABSTRACT

A fowl feeder has a plurality of sleeve members mounted on a central tubular body member hanging vertically from a feed conveyor tube. An upper sleeve member supports a spider ring member which supports a suspended plate member. The plate member is capable, upon rotation about the central tubular body member, of exposing a plurality of lateral apertures in the central tubular body member to dispense feed therethrough. A lower sleeve member is vertically movable on the centrals tubular body member relative to the suspended plate member to regulate dispensing of feed through the bottom of the central tubular body member. A pivotal pawl is attached to the lower sleeve member to control positioning of the plate member relative to the lower end of the central tubular body member.

5 Claims, 2 Drawing Sheets

FOWL FEEDER

The invention relates to a fowl feeder providing notable improvements and advantages over the known fowl feeders.

One of the main drawbacks of the known feeders, which are generally formed by a plate member removably to an upper spider member formed with radial arms which is supported on a central tubular body member hanging vertically from the feed conveyor tube, is to be found in the means for depositing a suitably controlled amount of feed falling through the tubular body member on the plate member.

Certain feeders are provided for such control with a sleeve member which may slide on the lower portion of the tubular body member and is adjustable in height to leave a greater or smaller passage between it and the bottom of the plate member.

For the same purpose, others are provided with two mutually threaded collars, the outer one of which holds the spider member and the plate member and the inner one moves vertically on the tubular body member depending on whether the latter is raised or not by the elevation or otherwise of the conveyor tube from which it hangs. Such raising or lowering causes the feed to be deposited on the plate member through the open lower end of the tubular body member or through openings in the side wall thereof, with the tubular body member comprising a shoulder on which, in the raised position, the inner collar is locked, closing the lateral openings and separating the plate member from the open lower end of the tubular body member so that the feed may pass therethrough, the gap being controlled by manipulation of the collars.

The first named feeders have the drawback that the sliding sleeve member is attached to the tubular body member with an easily deformable relatively fragile spring ring and those named in the second place have the drawback of it being necessary to raise or lower them by way of the conveyor tube, which drawback is aggravated in the raised position since, with the feeder being suspended and the feed flowing in through the lower portion of the tubular body member, the passage, the adjustment of which is effected by way of a screw thread, may be closed when the plate member is caused to rotate by the blows that the fowl may produce with their beating wings.

The above drawbacks and problems and others that may arise therefrom are overcome with the feeder of the invention, since the central tubular body member comprises means for regulating the supply of feed to the plate member which are easy to operate, highly reliable and may not be disadjusted, since it is not necessary to have the whole unit suspended to allow the feed to enter through one passage or the other and, even, both may be open.

To this end, the feeder of the invention comprises two sleeve members mounted on the tubular body member, a demountable upper one on which the spider member is integrally supported, said sleeve member being supported in turn on the tubular body member by way of respective steps allowing it to rotate to close or open the lateral openings of the tubular body member by placing lower flared outlets of the sleeve member in register therewith.

The other, lower sleeve member is the one which fits snugly to the plate member or is separated therefrom, allowing through the feed falling from the open end of the tubular body member, said passage being regulated by hand operation of a pawl which, pivotably attached to the sleeve, engages a rack member on the tubular body member.

A further improvement is the attachment of the spider member to the plate member, allowing the latter to be easily removed for cleaning, to which end the lower ring, the larger of the two with which the radially armed spider member is provided, is inverted U-shaped for engagement on the similarly shaped edge of the plate member, the spider member ring comprising wide lower L-shaped tabs which are inserted in apertures in the plate member edge so that, when the latter is rotated, they move to a narrower portion of said openings which will lock the engagement.

A further feature obtained with the new feeder embodiment is that the central tubular body member may be fully closed by abutting the lower sleeve member against the plate member and closing the lateral apertures of said body member with the upper sleeve member, whereby certain ones of the feeder units may be taken out of service, thereby avoiding the loss of food.

These and further features will be better understood from the following detailed description, accompanied by two sheets of drawings in which there is illustrated one exemplary non-limiting embodiment of the invention.

Figure 5:
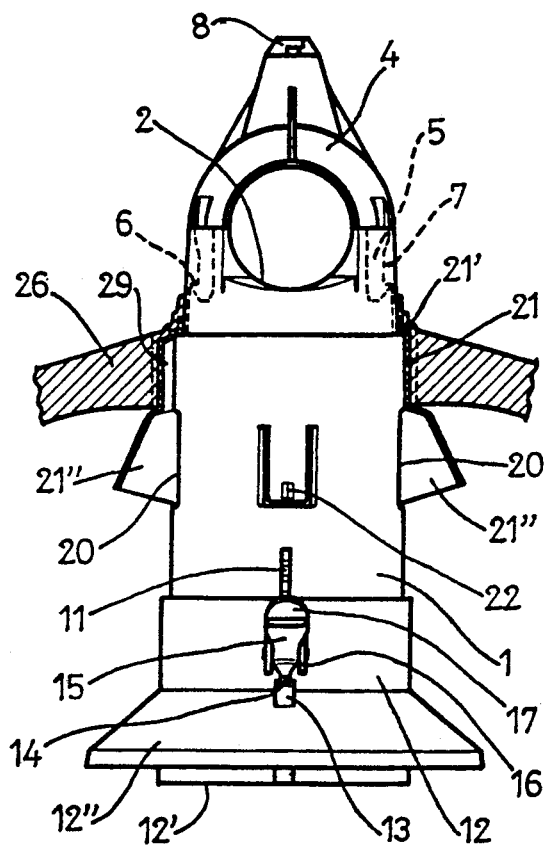
FIG. 5 is an elevation view of the tubular body member rotated 90° relative to FIG. 1, with the engagement means of the upper sleeve member and spider member in section.

According to the figures, the fowl feeder shown comprises a vertical tubular body member 1, terminated at the top end thereof with a channel 2 (see FIG. 5) adapted to receive the feed conveyor tube 3, from which it hangs when there is mounted thereon a head member 4 having an internal channel-shaped portion disposed on the tube 3, and which comprises at both sides at the bottom end thereof hook-shaped arms 5 which engage the shoulders 6 formed by projections 7 from the inner walls of the upper open end of the body member 1, with the arms 5 comprising reinforcement ribs (not shown) which pass between the projections 7 and guide the arms 5 into engagement thereof with the shoulders 6.

The head member 4 is terminated at the upper end thereof with a coupling means 8 for the cable 9 which is electrified to prevent the birds from roosting on the feed conveyor tube 3.

The said tubular body member 1 is provided externally thereof on the bottom half of the generatrix thereof with a guide member 10 comprising a rack means 11.

Figure 1:
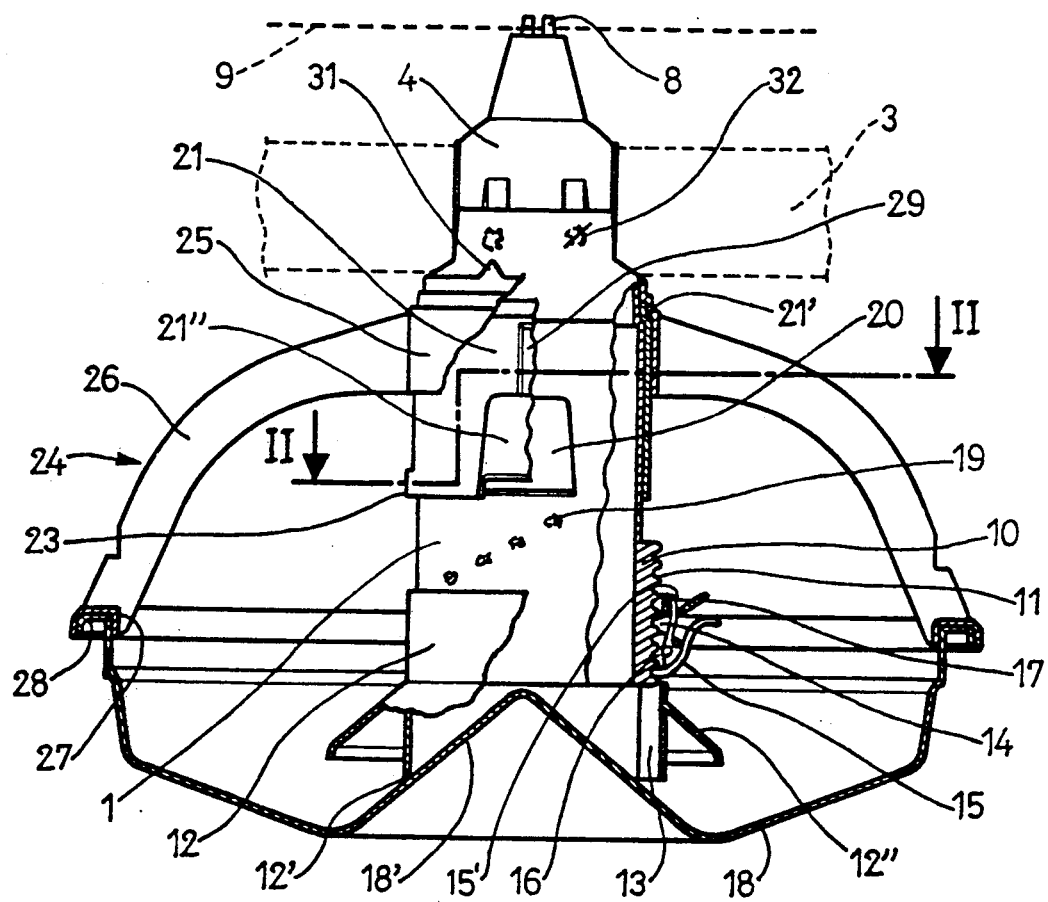
FIG. 1 is an elevation view, partly in cross section, of the feeder of the invention.

A sleeve member 12 having a channel 13 sliding on the said guide member 10 (FIGS. 1 and 5) is movable on the abovementioned portion of the tubular body member 1, with said channel 13 having an aperture 14 through which the leading end of a pawl 15 is inserted. The pawl 15 is pivotably mounted between two lugs 16 of the sleeve member 12. The lugs 16 are arranged on each side of the aperture 14, above which there is mounted an upwardly sloping transverse lug 17 which, in combination with the operating end of the pawl 15, allows manual operation of the pawl for retaining the sleeve member 12 at the desired height.

The pawl 15 comprises a resilient tab 15' which extends from the pivoting line of the pawl on the lugs 16 and holds the pawl engaged in the rack means 11. For which purpose, the free end thereof bears against the upper outer portion of the channel 13 passing through an aperture in the lug 17.

The height adjustment points for the sleeve member 12, which provide a larger or smaller separation thereof from the plate member 18, are marked by corresponding numbers 19 aligned stepwise or vertically on the outer wall of the tubular body member 1, the corresponding number being underlined by the edge of the open upper end of the sleeve member 12.

The feed is delivered between the open lower end 12' of the sleeve member and the upwardly extending conical protuberance 18' provided in the center of the plate member 18, the lower end of the sleeve member 12 being provided with a conical skirt member 12" protecting the feed delivery area from being pecked by the birds.

The tubular body member 1 is provided, at the upper end thereof, with two opposite apertures 20 through which the feed may optionally be caused to fall into the plate member 18. The delivery of the feed through said apertures forms a higher level thereof on the plate member 18 and allows the chicks or young birds easily to get out of the plate member where they have to enter to gain access to the feed.

An additional sleeve member 21 is rotatably mounted on the upper half of the tubular body member 1 and is maintained in this region by a step-like circular narrowing 21' of the open upper end thereof, which bears on a corresponding step of the tubular body member 1.

The sleeve member 21 comprises from the mid-portion to the open lower end thereof two opposite lateral flared outlets 21" of U section which, when in register with the apertures 20 allow the feed to flow through and guide it towards the plate member 18. The front protection of the apertures 20 prevents the chicks from being able to obtain feed from inside the tubular body member 1 or even get inside the body member, where they could be injured or asphyxiated when the feeder is raised or when feed is delivered.

Figure 2:
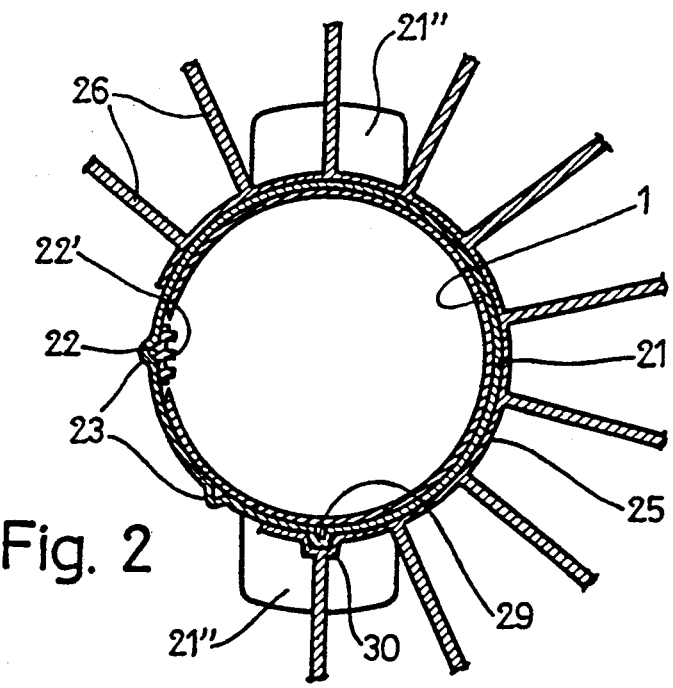
FIG. 2 is a detail in plan view along the line II—II of FIG. 1.

A tooth 22 (FIG. 2), provided on the outside of a portion of the tubular body member 1 which is partly cut away to make it resilient and suitably reinforced on the inside with ribs 22', is optionally inserted in one or the other of two slits 23, provided in the sleeve member 21, when said sleeve member is rotated, whereby the apertures 20 are opened or closed.

To facilitate the operation, the rotation is caused by moving the protective spider member 24 with which the feeder is completed and which supports the plate member 18.

The spider member 24 is formed by an upper ring 25 from which there extend a plurality of radial arms 26 allowing the birds' heads through. Said arms 26 are attached to a further lower concentric larger diameter ring 27 which is removably attached to the rim 28 of the plate member 18.

The upper ring 25 snugly fits around the upper portion of the sleeve member 21 and comprises an upper double stepped portion which bears on the open upper end and on the step 21' of said sleeve member. A vertically extending protrusion 29 on the generatrix of the sleeve member 21 which is inserted in key-like fashion in a channel 30 of the ring 25 allows the spider member 24 to be operated to cause the sleeve member 21 to rotate. The latter comprises a shoulder 31 on the edge of the open upper end thereof which indicates whether the apertures 20 are open or not, depending on whether it points to one or the other of two marks 32 provided on the tubular body member 1.

Figure 3:
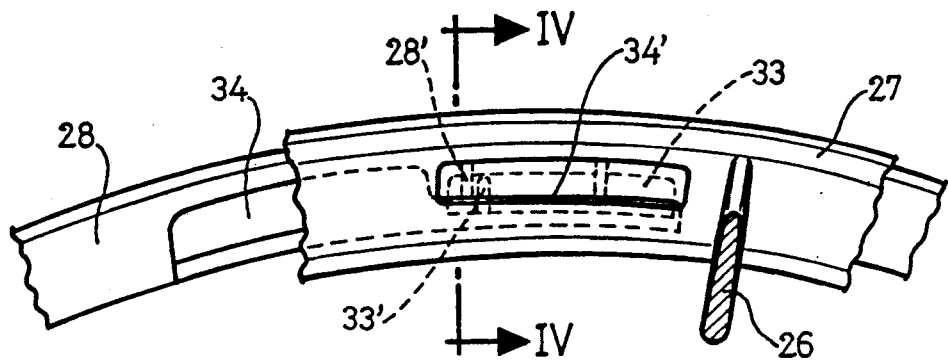
FIG. 3 is a plan view of the engagement means of the spider member with the plate member.
Figure 4:
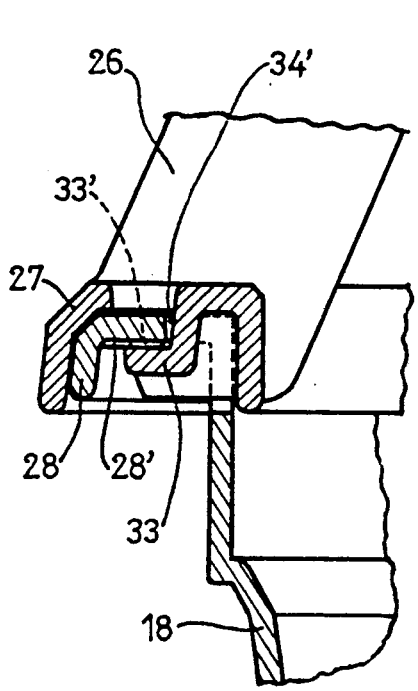
FIG. 4 is an elevation cross section view, on a larger scale, of the same engagement means along the line IV—IV of FIG. 3.

The lower ring 27 of the spider member 24 which has an inverted U shape, like the rim 28 of the plate member 18, but of a larger size (FIGS. 3 and 4), is mounted thereon and covers it, with wide downwardly extending L-shaped tabs 33 equidistantly spaced around the ring 27 penetrating in respective apertures 34 of said rim 28.

Thus when the plate member is rotated, said tabs slide sideways towards narrowed portions 34' of the apertures 34, thereby preventing the removal of the tabs 33 and holding the spider member and plate member in place.

Projections 28' under the rim 28 in the proximity of the narrowed portions 34' prevent, since a further upper projection 33' of the horizontal portion of the tabs 33, is located between said projections 28', the blows received from the birds' beating wings from disconnecting the ring, and assist in the perfect coupling of the plate member and the spider member, which may be easily separated by hand for cleaning.

The object of the invention may be embodied, within the essence thereof, in other ways differing only in detail from the exemplary embodiment shown and will fall equally under the scope of protection being sought.

We claim:

1. A fowl feeder comprising a central tubular body member having a first end adapted to be attached to a suspension member so that said body member will hang vertically therefrom, said body member having a second, open end; a plate member including a projection portion; means supporting said plate member on said central tubular body member with said projecting portion extending adjacent said second open end of said body member to control dispensing of feed through said second open end; said plate member including a rim; said means supporting said plate member comprising a first ring member attached to said rim, a second ring member surrounding the exterior of a portion of said central tubular member and a plurality of arms extending between and connecting said first and second ring members with said supporting means being rotatable relative to said central tubular member; a sleeve member rotatably mounted about a portion of said body member; said sleeve member and said body member each having lateral apertures disposed so that said apertures may be moved into and out of alignment by relative rotation between said sleeve member and said body member to control dispensing of feed through said apertures to said plate member; said sleeve member having a flared portion adjacent said aperture thereof to prevent access of the fowl to said aperture; said central tubular body member having resilient tooth means and said sleeve having a slit cooperating with said tooth means; said sleeve member having a circumferential shoulder; said second ring member including a double shoulder portion and said one end of said body member having a shoulder on which said circumferential shoulder and shoulder portion are supported; said sleeve member having a protrusion engaging said second ring member to prevent relative rotation therebetween.

2. The fowl feeder as claimed in claim 1, wherein said first ring member is U-shaped and said rim of said plate member is U-shaped and has dimensions so as to fit in said first ring member, said first ring member having equidistantly spaced L-shaped tabs and said rim having corresponding apertures for receiving each of said tabs, each tab having a vertically extending portion, in use, so that when said plate member is caused to rotate, said vertical portions pass through said apertures to effect a coupling of said plate member to said first ring member.

3. The feeder as claimed in claim 1, wherein another sleeve member is mounted on said central tubular body adjacent said second, open end of said body member; said another sleeve member including a vertical channel and being adapted to slide vertically relative to said central tubular body member; said body member including toothed rack means and said another sleeve member including a resilient pawl for engaging said rack means for retaining said another sleeve member at a selected distance from said plate member; said pawl being pivotally mounted between two external lugs of said another sleeve member and being manually releasable; the said distance of said second sleeve member relative to said plate member serving to regulate the quantity of feed passed to said plate member from the interior of said central tubular body member.

4. The fowl feeder as claimed in claim 1, wherein said central tubular body member is provided with a plurality of indicia spaced there along to indicate relative to said spider member the feeding position of said second opened end of said body member.

5. The fowl feeder as claimed in claim 1, wherein said first end includes means for suspending a cable thereon and said one end of said body member having means for communicating with a feed conveyor to receive feed into the interior of said body member, said central tubular body member having a head member attached thereto at said first end thereof by hook means extending into the interior of said first end, said interior of said body member including shoulder members for engaging said hook members.

* * * * *

UNITED STATES PATENT AND TRADEMARK OFFICE
CERTIFICATE OF CORRECTION

PATENT NO. : 5,007,380

DATED : April 16, 1991

INVENTOR(S) : ROVIRA BADIA, Antonio; FRANCO TARAZAGA, Jose

It is certified that error appears in the above-identified patent and that said Letters Patent is hereby corrected as shown below:

Title page:

INVENTORS: Change "Antonio R. Badia" to -- Antonio Rovira Badia --

Change "Jose F. Tarazaga" to -- Jose Franco Tarazaga --

ASSIGNEE: Change "Innovationes" to -- Innovaciones --

Column 1, line 8 after "removably" insert -- fixed -- .

Signed and Sealed this

Tenth Day of November, 1992

Attest:

DOUGLAS B. COMER

*Attesting Officer*   *Acting Commissioner of Patents and Trademarks*